July 29, 1958 — E. J. SCHNEIDER — 2,845,109
MACHINE FOR FORMING HELICALLY-WOUND LAMINATED TUBES
Filed Dec. 31, 1954 — 2 Sheets-Sheet 1
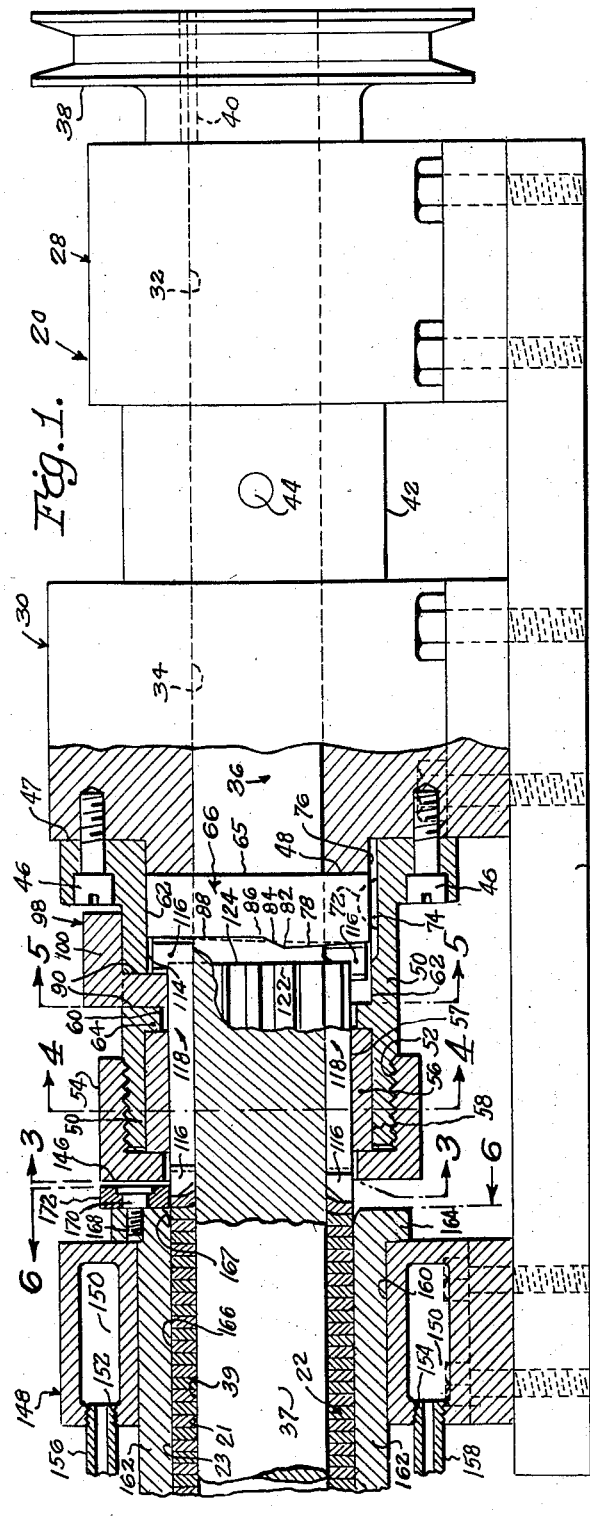
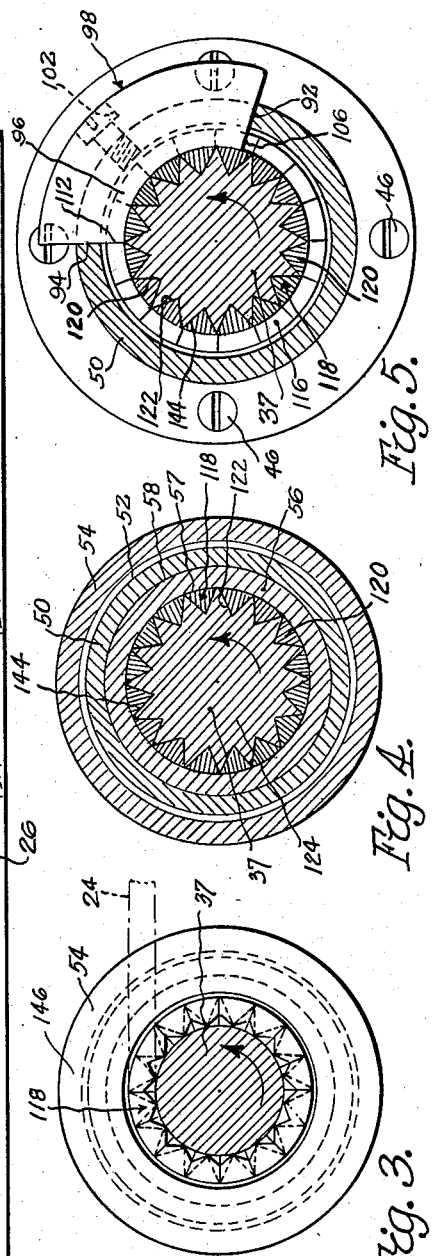
INVENTOR.
Ervin J. Schneider
BY Barthel & Bugbee
Attys

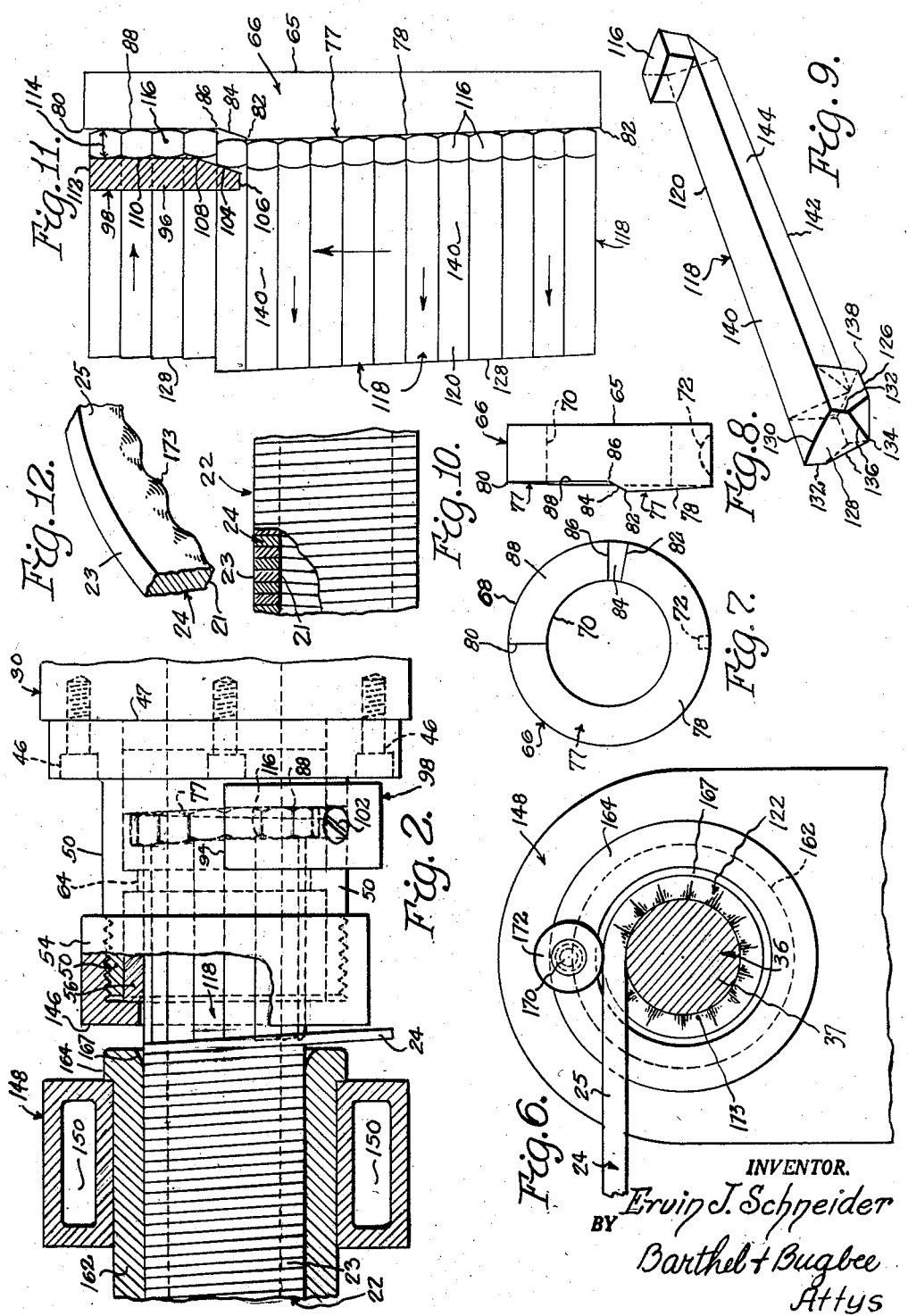

United States Patent Office 2,845,109
Patented July 29, 1958

2,845,109

MACHINE FOR FORMING HELICALLY-WOUND LAMINATED TUBES

Ervin J. Schneider, Detroit, Mich.

Application December 31, 1954, Serial No. 479,192

7 Claims. (Cl. 154—1.8)

This invention relates to processes and machines for forming laminated tubes and, in particular, to processes and machines for winding laminated tubes on a rotating mandrel from a supply of strip material.

One object of this invention is to provide a machine for spirally winding a strip of material, such as plastic-impregnated fabric, upon a mandrel while pushing the material axially therealong so as to cause the convolutions so formed to adhere to one another and form a laminated tube.

Another object is to provide a machine of the foregoing character wherein the axial pushing of the strip material is accomplished by means of axially-reciprocable feed elements or fingers which are rotated as they are reciprocated, so that there is substantially no relative motion between the strip material being fed and the ends of the feeding elements or fingers, thereby preventing frictional heating and consequent premature adhesion of the material prior to its entrance into the bore of a forming sleeve surrounding the mandrel.

Another object is to provide a machine of the foregoing character wherein the feed elements or fingers are advanced and retracted by stationary cams against which they impinge as they are rotated through a circular orbital path, the feed elements or fingers being preferably mounted in a longitudinally-grooved shaft, the grooves of which provide a driving connection with the feed fingers as well as freedom for axial motion of the fingers along the shaft in response to their engagement with the feed cam.

Another object is to provide a machine of the foregoing character wherein the cam and consequently the feed fingers are provided with a dwell station or portion of their orbital path wherein the feed fingers are retracted to allow the entrance of the strip material at the inlet location.

Another object is to provide a process of making laminated spirally-wound tubing wherein an elongated strip of plastic-impregnated material is wound upon a rotating mandrel into side-to-side contact with previously-formed convolutions thereof while an axial force is applied to the exposed side of the strip to feed the strip material axially during winding, and at the same time the strip material being wound is confined within the bore of a sleeve surrounding the mandrel in radially-spaced relationship, whereby the spirally-wound laminated tube is expelled at the opposite end of the bore.

Another object is to provide a process according to the object immediately preceding, wherein the material being wound is moved through a heating zone to thermoplastically unite the convolutions in side-to-side relationship.

Another object is to provide an article of manufacture comprising an elongated strip of plastic-impregnated fabric disposed spirally in tubular form with its convolutions united in side-to-side relationship.

Other objects and advantages of the invention will become apparent during the course of the following description of the accompanying drawings, wherein:

Figure 1 is a fragmentary side elevation, partly in central vertical section, through a tube winding machine for spirally winding a laminated tube from a supply of strip material while the tube is automatically advanced axially as it is being wound, certain portions of the winding and guiding mechanism being shown in central vertical section;

Figure 2 is a fragmentary top plan view of the left-hand end portion of Figure 1, with the confining sleeve and adjacent portions of the winding and guiding mechanism shown partly in horizontal section;

Figure 3 is a cross-section taken along the line 3—3 in Figure 1, looking at the outer ends of the feed fingers or elements;

Figure 4 is a cross-section taken along the line 4—4 in Figure 1, showing the axially-grooved shaft construction by which the feed elements or fingers are simultaneously rotated and reciprocated;

Figure 5 is a cross-section taken along the line 5—5 in Figure 1, showing the feed finger retracting cam by which the feed elements or fingers are drawn back to their starting positions after advancing the strip material into the confining sleeve;

Figure 6 is a cross-section taken along the line 6—6 in Figure 1, looking toward the confining sleeve and showing the strip material at its point of entrance thereto, together with the guide rollers associated therewith;

Figure 7 is a front elevation of the feed element pusher cam, removed from the machine;

Figure 8 is a side elevation of the feed element pusher cam shown in Figure 7;

Figure 9 is an enlarged perspective view of one of the feed elements or fingers employed with the machine of Figures 1 and 2;

Figure 10 is a fragmentary side elevation, partly in vertical section, of a portion of a finished spirally-wound laminated tube produced by the machine of Figures 1 and 2 and the process of the invention;

Figure 11 is a layout or developed view of the feed cam, feed elements and retraction cam shown in their successive positions during one revolution thereof, as laid out in a plane or flat area for clarity of illustration; and Figure 12 is a fragmentary perspective view of a short portion of the strip material forming the tube, showing the undulating formation along its inner periphery resulting from the buckling of the material because of the shorter radius of the inner periphery of the tube in comparison with the radius of the outer periphery thereof.

Referring to the drawings in detail, Figure 1 shows a machine, generally designated 20, for winding laminated spirally wound tubes 22 having inner and outer surfaces 21 and 23 and formed from strip material 24 of plastic-impregnated fabric or other suitable material (Figure 10) having opposite sides 25 (Figure 12). The machine 20 is mounted upon a frame 26 including bearing brackets 28 and 30. Journaled in the bearing bores 32 and 34 of the bearing brackets 28 and 30 is a rotary shaft 36 having at one end a mandrel portion 37 with a peripheral surface 39 and having a drive pulley 38 keyed or otherwise secured as at 40 to its other end. Between the bearing brackets 28 and 30 on the shaft or mandrel 36 is mounted a collar 42 which is pinned or otherwise secured thereto as at 44 to prevent endwise motion of the shaft 36. Secured as at 46 to the offset peripheral portion 47 of the front face 48 of the bearing bracket 30 is a flanged sleeve 50 which is threaded as at 52 at its forward end to receive a flanged internally-threaded retaining collar 54 which holds in position a hardened steel bearing sleeve 56 having a bearing bore 57 therein. The sleeve 56 is seated in a forward bore 58 inside the sleeve 50 and communicating with a smaller diameter intermediate bore 60 which in turn opens into a rearward bore 62 of approximately the same diameter as the forward bore 58 and separated from it by the annular shoulder 64 adjacent the bore 60.

Mounted in the rearward bore 62 of the flanged sleeve 50 with its rearward face 65 abutting the front face 48 of the bearing bracket 30 is an annular stationary cam, generally designated 66 (Figure 1), shown detached from the machine in Figures 7 and 8. The cam 66 has outer and inner cylindrical surfaces 68 and 70 respectively, the outer surface 68 fitting the rearward bore 62 and containing a keyway 72 by which it is secured against rotation to the flanged sleeve 50 by means of a Woodruff key 74 engaging the keyway 76 in the rearward bore 62. The front face 77 of the cam 66 is for the most part in the form of a helical ramp 78 having its low point at 80 (Figure 11) approximately at the top thereof and its high point at the location 82 slightly less than 270° away from the low point 80 looking in a counterclockwise direction in Figure 7. From the high point 82, the cam face 77 is inclined rearwardly as at 84 to a low point 86 approximately 90° away from the low point 80 and separated therefrom by a dwell portion 88 having neither rise nor fall. In Figure 11, the periphery of the cam 66 is shown in a so-called developed view as if the peripheral surface were in the form of a thin band which was stripped off and laid out on a flat surface or plane.

The flanged sleeve 50 is provided with an arcuate slot 90 extending therethrough for slightly more than 90° of circumferential extent, namely from the end 92 located approximately opposite the high point 82 of the cam face 77 to the end 94 located approximately opposite the low point 80 at the end of the dwell portion 88. Projecting radially into the slot 90 between the ends 92 and 94 thereof is the arcuate radial portion 96 of a retraction cam, generally designated 98, having an arcuate flange 100 which is secured as by the screw 102 to the flanged sleeve 50. The cam 98 has a bevel portion 104 leading from the end 106 thereof approximately opposite the high point 82 of the cam face 77 to a point 108 approximately opposite the low point 86 whence it joins the flat face 110 extending as far as the opposite end 112 of the retraction cam 98. The cams 66 and 98 are spaced apart from one another a sufficient distance to provide a space 114 between their facing inner surfaces 88 and 110 respectively (Figure 11) sufficient to slidably receive the transverse rectangular projections 116 on the rearward ends of feed elements or fingers, generally designated 118 (Figure 9).

Each feed element or finger 118 is provided with an elongated body portion 120 of approximately triangular cross-section (Figures 4, 5 and 9) adapted to fit into correspondingly-shaped elongated parallel V grooves 122 disposed in an annular path around and axially along the shaft 36 forwardly of the location of the stationary cam 66 in an enlarged intermediate portion 124 of the shaft 36. The V-grooves 122 impart to the enlarged diameter shaft portion 124 the cross-sectional appearance of a multipointed star (Figures 4 and 5), with the result that the fingers 118 are positively driven in a circumferential direction in synchronism with the rotary shaft 36 while adapted to slide axially therealong. Each feed element or finger 118 terminates at its forward end in an inwardly-projecting head 126 having a forward end surface or pusher surface 128 having the approximate outline of a wedge with an arcuate outer edge 130, radial side edges 132 and a pointed inner portion 134 formed by opposite converging bevel surfaces 136 (Figure 9). The head 126 has an arcuate inner surface 138 which is concentric with the arcuate outer surface 140 of the body 120 of the feed element or finger 118, and has a sharp ridge 142 joined thereto by flat diverging sides 144 fitting the sides of the groove 122.

Immediately adjacent the forward end 146 of the internally-threaded flanged collar 54 is mounted a hollow annular support 148 containing a chamber 150 provided with inlet and outlet ports 152 and 154 for the admission and discharge of a heating fluid by means of inlet and outlet pipes 156 and 158 respectively. The annular support 148 is shaped approximately like the bearing brackets 28 and 30 and, like them, is bolted to the base 26. The support 148 contains a bore 160 coaxial with the bearing bracket bores 32 and 34 but of sufficiently large diameter to receive a sleeve 162 having a flange 164 adjacent the forward end 146 of the flanged collar 54 but spaced a short distance away from the latter. The sleeve 162 is provided with a bore 166 having a flared entrance 167, the diameter of the bore 166 being approximately equal to the external diameter desired for the laminated tube 22 forming the workpiece in the present machine and consequently having substantially the same internal diameter as the diameter of the external surface 23 of the tube 22. The internal surface 21 of the tube or workpiece 22 has substantially the same diameter as the external diameter of the mandrel portion 37.

The flange 164 on the sleeve 162 is drilled and threaded as at 168 (Figure 1) axially to receive a pivot screw 170 upon which a guide wheel or roller 172 is rotatably mounted (Figures 1 and 6). The guide wheel or roller 172 and the hole 168 for its pivot screw 170 are so located that the periphery of the roller 172 is approximately coincident with the bore 166 in the sleeve 162.

In the operation of the invention, let it be assumed that the plastic-impregnated fabric strip material 24 is supplied wound on a suitable conventional spool, drum or other suitable conventional holder (not shown) mounted in such a position that the strip 24 proceeds tangentially to the periphery of the mandrel portion 37 of the rotary shaft 36 beneath the roller 172 (Figure 6). The end of the strip 24 is threaded between the mandrel portion 37 and the roller 172 (Figures 1 and 6) into the space between the peripheral surface 39 of the mandrel portion 37 and the flared entrance 167 so that it enters the space between the coaxial cylindrical surfaces 39 and 166 and frictionally engages the mandrel portion 37 sufficiently to wind thereon during rotation of the latter. A heating fluid is supplied to the annular chamber 150 surrounding the sleeve 162 in order to provide heat for softening the impregnating material or bond of the strip material 24; power is applied to the pulley 38 to rotate the shaft 36 and its mandrel portion 37 in a clockwise direction in Figure 6 or counterclockwise direction in Figures 3, 4 and 5.

As the mandrel portion 37 rotates, carrying with it the strip 24 by frictional engagement therewith and winding the latter upon the cylindrical peripheral surface 39 thereof, the feed elements or fingers 118 are caused to move in an annular path coaxial with the shaft 36 and simultaneously caused to slide forward (to the left in Figures 1, 2 and 11) in their respective V-grooves 122 by the engagement of their outwardly-projecting portions 116 with the cam surface 77 of the stationary cam 66 as the portions 116 slide over the cam surface 77 of the stationary cam 66 while traveling in their annular path. This action causes forward end surfaces 128 on the heads 126 of the fingers 118 to push against the rearward side of the strip material 24 (Figure 1) so as to force it to slide sidewise axially along the mandrel portion 37 into the sleeve bore 166 as the projections 116 travel in their annular path along and in engagement with the inclined helical ramp portion 78 of the cam surface 77 of the stationary cam 66. When the projections 116 reach the high point 82 of the cam 66, they enter the space between the reversely-inclined portion 84 thereof and the bevel portion 104 of the retraction cam 98, the bevel portion 104 engaging the projection 116 of each finger 118 to retract the finger to its starting position adjacent the low point 86 of the cam surface 77. During the remaining approximately quarter circumference of the cam 66, the projections 116 on the fingers 118 traverse the space 114 between the cams 66 and 98, following the level portion or dwell portion 88 of the cam surface 77 back to the location 80 (Figures 1, 7 and 8) where the strip 24 begins to be wound beneath the roller 172 (Figure 6) upon the mandrel portion 37 of the shaft 36.

As a consequence of this action and operation and the heating of the convolutions of the plastic-impregnated fabric strip material 24, a tube 22 is continuously formed by the winding and adhesion of the thereby sticky sides 25 of the heated plastic-impregnated fabric strip 24 to the various convolutions wound upon the mandrel portion 37. A counter-pressure in the rearward or right-hand direction in Figure 1 is optionally applied, such as by any suitable conventional frictional means (not shown) at the extreme left-hand end of Figures 1 and 2 to the finished end of the tube 22 opposing the axial pressure applied to the strip 24 by the feed elements or fingers 118 acting against the cam 66. Since the outer surface 23 of the tube or workpiece 22 is of greater diameter than the inner surface 21 thereof, the strip 24 is caused to buckle in an undulating manner shown by the intermittent shaded portions 173 of Figures 6 and 12, since the excess material at this location has no other place to go. The tube 22 is thus, in effect, extruded continually from the left-hand end of the bore 166 of the sleeve 162, and is cut off from time to time in desired lengths by cutting means (not shown).

Each feed element or finger 118 is provided with bevelled surfaces 136 (Figure 9) to provide clearances for the compressed inner fibers of the strips 24 of the material being wound, as shown by the undulations or bulges 173 in Figures 6 and 12. These bevelled clearances make it possible to edge wind the strip material 24 without stretching the outside fibers of the material being wound. As a result, the wall thickness of any tube formed by this machine and with this method is not limited by the elasticity of the material being edge wound. The bevelled surfaces 136 on the sides of the heads 126 of the feed fingers 118 (Figure 9) thus uniformly compress the inside fibers as at 173 so that each successive convolution will nest within the previously wound convolution.

What I claim is:

1. A machine for making a helically-wound laminated tube from an elongated continuous flexible strip, comprising a frame, a shaft including a strip-winding mandrel rotatably mounted in said frame and disposed in tangential winding relationship with said strip, a hollow member having a strip-confining bore disposed in radially-disposed co-axial encircling relationship with said mandrel, means for rotating said mandrel to wind said strip helically thereon, means comprising axially-movable pusher elements disposed circumferentially around said mandrel for pushing the wound convolutions of said strip axially along said mandrel into said bore into side-to-side engagement with one another, and means for supplying heat to said bore, and means for advancing said pusher elements axially along said mandrel.

2. A machine for making a helically-wound laminated tube from an elongated continuous flexible strip, comprising a frame, a shaft including a strip-winding mandrel rotatably mounted in said frame and disposed in tangential winding relationship with said strip, a hollow member having a strip-confining bore disposed in radially-spaced co-axial encircling relationship with said mandrel, means for rotating said mandrel to wind said strip helically thereon, means comprising axially-movable pusher elements disposed circumferentially around said mandrel for pushing the wound convolutions of said strip axially along said mandrel into said bore into side-to-side engagement with one another, and means for supplying heat to said bore, and means comprising a cam engaging said pusher elements for advancing said pusher elements axially along said mandrel.

3. A machine for making a helically-wound laminated tube from an elongated continuous flexible strip, comprising a frame, a shaft including a strip-winding mandrel rotatably mounted in said frame and disposed in tangential winding relationship with said strip, a hollow member having a strip-confining bore disposed in radially-disposed co-axial encircling relationship with said mandrel, means for rotating said mandrel to wind said strip helically thereon, and means comprising axially-movable pusher elements disposed circumferentially around said mandrel for pushing the wound convolutions of said strip axially along said mandrel into said bore into side-to-side engagement with one another, and means for supplying heat to said bore, means for advancing said pusher elements axially along said mandrel, and means for retracting said pusher elements.

4. A machine for making a helically-wound laminated tube from an elongated continuous flexible strip, comprising a frame, a shaft including a strip-winding mandrel rotatably mounted in said frame and disposed in tangential winding relationship with said strip, a hollow member having a strip-confining bore disposed in radially-disposed co-axial encircling relationship with said mandrel, means for rotating said mandrel to wind said strip helically thereon, means comprising axially-movable pusher elements disposed circumferentially around said mandrel for pushing the wound convolutions of said strip axially along said mandrel into said bore into side-to-side engagement with one another, and means for supplying heat to said bore, and means comprising a cam engaging said pusher elements, said cam having a forwardly-inclined ramp portion configured for advancing said pusher elements axially along said mandrel and a rearwardly-inclined ramp portion for retracting said pusher elements reversely along said mandrel.

5. A machine for making a helically-wound laminated tube from an elongated continuous flexible strip, comprising a frame, a shaft including a strip-winding mandrel rotatably mounted in said frame and disposed in tangential winding relationship with said strip, a hollow member having a strip-confining bore disposed in radially-disposed co-axial encircling relationship with said mandrel, means for rotating said mandrel to wind said strip helically thereon, means comprising axially-movable pusher elements disposed circumferentially around said mandrel for pushing the wound convolutions of said strip axially along said mandrel into said bore into side-to-side engagement with one another, and means for supplying heat to said bore, and means comprising a cam engaging said pusher elements, said cam having a forwardly-inclined ramp portion configured for advancing said pusher elements axially along said mandrel and a dwell portion for holding said pusher elements momentarily stationary in an axial direction and a rearwardly-inclined ramp portion for retracting said pusher elements reversely along said mandrel.

6. A machine for making a helically-wound laminated tube from an elongated continuous flexible strip, comprising a frame, a shaft including a strip-winding mandrel rotatably mounted in said frame and disposed in tangential winding relationship with said strip, a hollow member having a strip-confining bore disposed in radially-disposed co-axial encircling relationship with said mandrel, means for rotating said mandrel to wind said strip helically thereon, means comprising axially-movable pusher elements disposed circumferentially around said mandrel for pushing the wound convolutions of said strip axially along said mandrel into said bore into side-to-side engagement with one another, and means for supplying heat to said bore, means comprising a cam engaging said pusher elements, said cam having a forwardly-inclined ramp portion configured for advancing said pusher elements axially along said mandrel and a dwell portion for holding said pusher elements momentarily stationary in an axial direction and a rearwardly-inclined ramp portion for retracting said pusher elements reversely along said mandrel, and auxiliary cam means for assisting in the retraction of said pusher elements.

7. A machine for making a helically-wound laminated tube from an elongated continuous flexible strip, comprising a frame, a shaft including a strip-winding mandrel rotatably mounted in said frame and disposed in tangential winding relationship with said strip, a hollow member having a strip-confining bore disposed in radially-spaced coaxial encircling relationship with said mandrel, means for rotating said mandrel to wind said strip helically thereon, means comprising axially-movable pusher elements disposed circumferentially around said mandrel for pushing the wound convolutions of said strip axially along said mandrel into said bore into side-to-side engagement with one another, and means for supplying heat to said bore, said mandrel having longitudinally elongated guideways therealong and said pusher elements slidably engaging said guideways.

References Cited in the file of this patent

UNITED STATES PATENTS

| | | |
|---|---|---|
| 860,720 | Adams | July 23, 1907 |
| 1,523,927 | Beebe | Jan. 20, 1925 |
| 1,697,158 | Bastian | Jan. 1, 1929 |
| 1,795,380 | Stresau | Mar. 10, 1931 |
| 1,939,581 | Tesmer | Dec. 12, 1933 |
| 2,002,896 | Kopetz | May 28, 1935 |
| 2,033,717 | Kopetz | Mar. 10, 1936 |
| 2,237,309 | McMinn | Apr. 8, 1941 |
| 2,331,969 | Friedricks et al. | Oct. 19, 1943 |
| 2,380,111 | Kasten | July 10, 1945 |
| 2,416,416 | Stoltz | Feb. 25, 1947 |
| 2,603,579 | Kramer | July 15, 1952 |
| 2,688,906 | Dokopil | Sept. 14, 1954 |